(12) United States Patent
Koma et al.

(10) Patent No.: US 7,602,450 B2
(45) Date of Patent: Oct. 13, 2009

(54) HEADS-UP DISPLAY SYSTEM

(75) Inventors: Norio Koma, Gifu (JP); Masashi Mitsui, Gifu-ken (JP)

(73) Assignee: Epson Imaging Devices Corporation, Nagano (JP)

( * ) Notice: Subject to any disclaimer, the term of this patent is extended or adjusted under 35 U.S.C. 154(b) by 316 days.

(21) Appl. No.: 11/487,082

(22) Filed: Jul. 14, 2006

(65) Prior Publication Data

US 2007/0018907 A1    Jan. 25, 2007

(30) Foreign Application Priority Data

Jul. 19, 2005   (JP) .............. 2005-208876
Sep. 8, 2005    (JP) .............. 2005-261363

(51) Int. Cl.
*G02F 1/1335*   (2006.01)

(52) U.S. Cl. ............................................ 349/11

(58) Field of Classification Search ........... 345/7; 349/11
See application file for complete search history.

(56) References Cited

U.S. PATENT DOCUMENTS

| | | | |
|---|---|---|---|
| 5,076,664 A | | 12/1991 | Migozzi |
| 6,744,478 B1 * | | 6/2004 | Asakura et al. ............ 349/11 |
| 7,123,418 B2 * | | 10/2006 | Weber et al. .............. 359/630 |
| 7,355,796 B2 * | | 4/2008 | Robinson .................. 359/630 |
| 2002/0048058 A1 * | | 4/2002 | Nishikawa et al. ......... 359/15 |
| 2002/0089613 A1 * | | 7/2002 | Eberhardt et al. .......... 349/11 |

FOREIGN PATENT DOCUMENTS

| | | |
|---|---|---|
| EP | 0 399 865 A1 | 11/1990 |
| EP | 0 424 950 A2 * | 2/1991 |
| EP | 0 424 950 A2 | 5/1991 |
| EP | 0 424 950 A3 | 5/1991 |
| JP | 2003-295105 | 10/2003 |

OTHER PUBLICATIONS

European Search Report for European Patent Application No. 06 25 3481, dated Feb. 6, 2007.

* cited by examiner

*Primary Examiner*—Michelle R Connelly Cushwa
(74) *Attorney, Agent, or Firm*—McCarter & English, LLP

(57) ABSTRACT

A heads-up display system includes a liquid crystal display unit that can change optical characteristics in accordance with a video signal. The light modulated by the liquid crystal display unit is projected on a surface of a transparent plate that can reflect the light so as to realize a projection display. The light projected on the transparent plate is polarized light having a transmission axis extending in a direction parallel to a line defining the center with respect to incident light and reflective light of the transparent plate.

9 Claims, 8 Drawing Sheets

HEADS-UP DISPLAY SYSTEM

PRIORITY INFORMATION

The entire disclosure of Japanese Patent Applications No. 2005-208876 filed on Jul. 19, 2005 and No. 2005-261363 filed on Sep. 8, 2005 are expressly incorporated by reference herein.

BACKGROUND OF THE INVENTION

1. Field of the Invention

The present invention relates to a heads-up display system that includes a liquid crystal display unit that can display a projection image on a transparent plate, such as a windshield glass of an automotive vehicle.

2. Description of the Related Art

Conventional heads-up display systems that can display various projection images on a windshield glass of an automotive vehicle are known. A typical heads-up display system utilizes a mechanism of projecting virtual images at a predetermined position equivalent to an optical path length forward from the windshield glass. Accordingly, a driver of a vehicle on which such a system is installed can view avisible display of projected images while continuing to look forward.

A heads-up display system of this type is disclosed in, for example, Japanese Patent Application Laid-open No. 2003-295105. According to the disclosed heads-up display system, the light of display images is directed toward a glass plate such as a front windshield. Because the majority of the irradiated light passes through the glass plate, increasing the reflection efficiency in the projection display is desired to provide a finer and more easily viewable heads-up display.

SUMMARY OF THE INVENTION

The present invention is directed to a heads-up display system including a liquid crystal display unit that can change optical characteristics in accordance with a video signal. The liquid crystal display unit emits modulated light that is projected on a surface of a transparent plate. The light reflects on the plate so as to realize a projection display. The light projected on the transparent plate is polarized light having a transmission axis extending in a direction parallel to a line defining the center with respect to incident light and reflective light of the transparent plate.

Accordingly, the light can efficiently reflect on the transparent plate, and a fine projection display can be realized.

Furthermore, it is preferable to use two half-wave plates that can twice change the direction of the transmission axis of the linearly polarized light having passed through the liquid crystal. The differences of transmission axis directions among RGB color beams can be eliminated and a desired color display can be realized.

BRIEF DESCRIPTION OF THE DRAWINGS

The accompanying drawings, which are incorporated in and constitute a part of the specification, illustrate aspects of the invention and, together with the description, serve to explain the principles of the invention, in which.

DESCRIPTION OF PREFERRED EMBODIMENT

A preferred embodiment of the present invention will be described with reference to the drawings.

Figure 1:
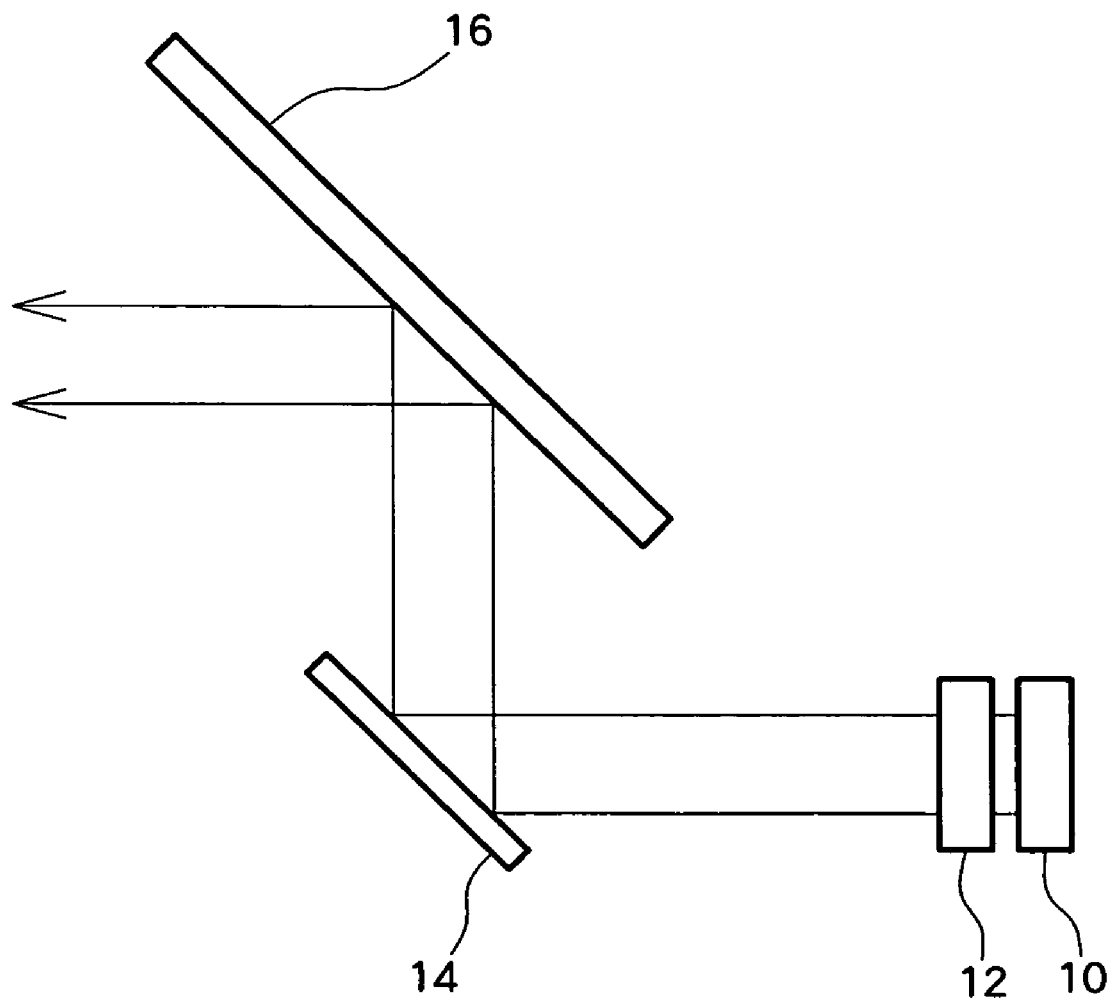
FIG. 1 is a view showing a schematic arrangement of a heads-up display system in accordance with an embodiment of the present invention.

FIG. 1 is a view showing a schematic arrangement of a heads-up display system according to an embodiment of the present invention.

A backlight 10 can emit white light advancing forward, or can include RGB light-emitting elements. The backlight 10 is constituted by, for example, LEDS, a cold cathode ray tube, or an EL (i.e., electroluminescence) elements.

A transmissive liquid crystal display apparatus 12 is disposed in front of the backlight 10. The liquid crystal display apparatus 12 includes numerous display pixels disposed in a matrix pattern and a display control unit that can control a voltage applied to each pixel. When a video signal (i.e., a control signal for the display) is supplied to the liquid crystal display apparatus 12, the liquid crystal display apparatus 12 can produce modulated light based on the video signal and can emit transmissive light.

It is, however, also possible to constitute the liquid crystal display apparatus 12 as a reflective type. In such a case, the liquid crystal display apparatus 12 can emit reflective light as modulated light obtained based on the video signal.

Furthermore, the liquid crystal display apparatus 12 can include RGB color filters to obtain a color video.

The modulated light can advance forward from the liquid crystal display apparatus 12 and reach a mirror 14. Then, the light reflects on the mirror 14 and can reach a windshield glass 16.

With the above arrangement, a video output supplied from the liquid crystal display apparatus 12 can be projected on the windshield glass 16, and an observer (e.g., a driver of an automotive vehicle) looking forward through the windshield glass 16 can view the projected video.

The video projected on the windshield glass 16 is a virtual image supplied from the liquid crystal display apparatus 12. The projected video is positioned forward from the windshield glass 16 by an amount equivalent to an optical path length between the windshield glass 16 and the liquid crystal display apparatus 12. Accordingly, a driver of an automotive vehicle can enjoy a video projected at an appropriate forward position from an appropriate view angle.

A practical liquid crystal display apparatus can include a plurality of mirrors that can form a required optical path and an optical system including lenses and concave mirrors that can enlarge a video and adjust the focus of image for the purpose of realizing a compact body of the apparatus.

FIRST STRUCTURAL EXAMPLE

Figure 2:
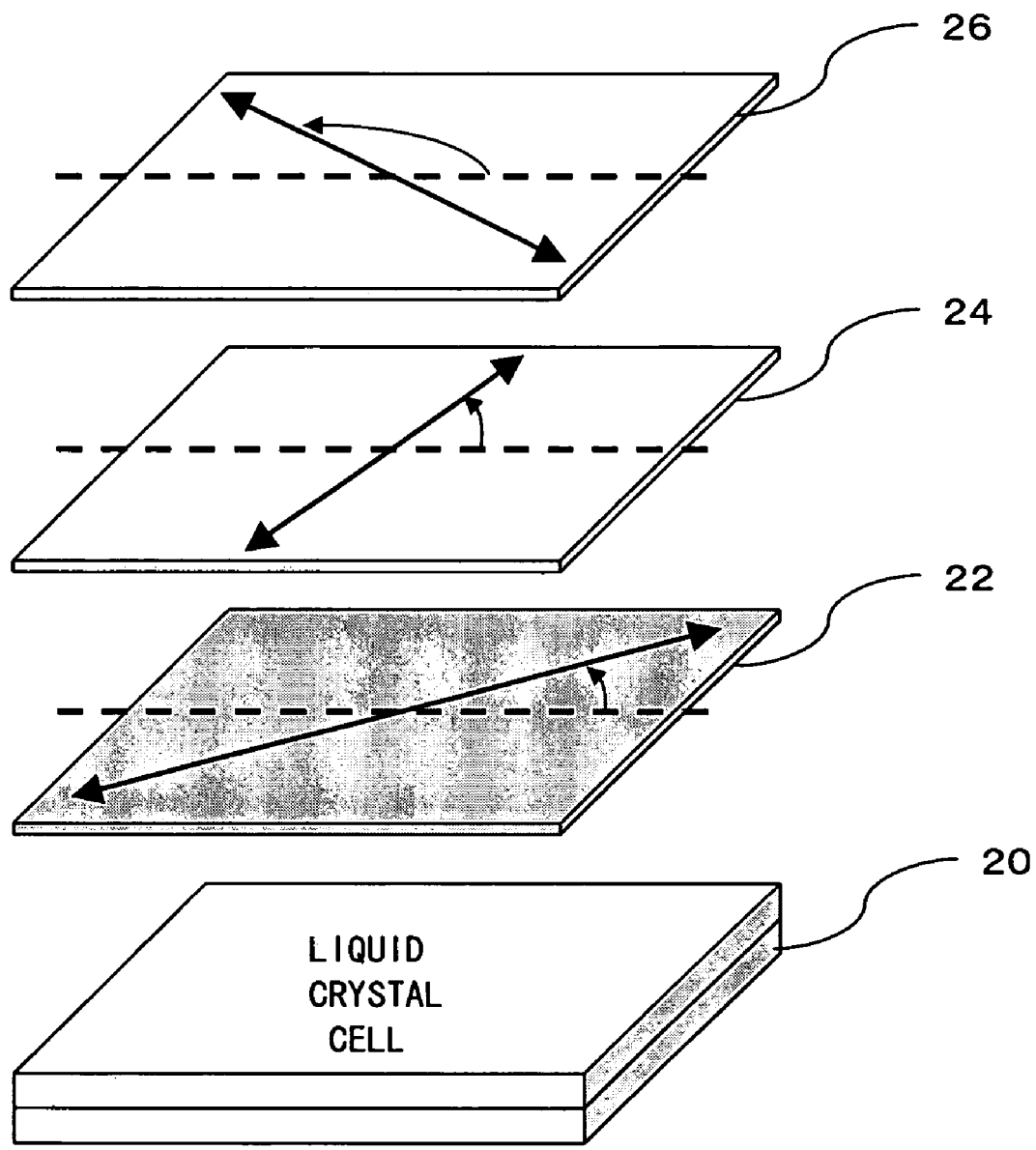
FIG. 2 is a perspective view showing the arrangement of a liquid crystal display apparatus according to a first structural example of the present invention.

The configuration shown in FIG. 2 includes the essential components of a liquid crystal display apparatus 12 according to a first structural example. In the present example, the liquid crystal display apparatus 12 is a transmissive type that includes a liquid crystal cell 20 consisting of numerous display pixels disposed in a matrix pattern and a display control unit that can control a voltage applied to the liquid crystal constituting each pixel.

More specifically, the liquid crystal cell 20 includes a pixel substrate on which numerous pixel electrodes are disposed in a matrix pattern. Each pixel electrode is connected to a pixel circuit that can control a voltage supply to the pixel electrode. The pixel substrate is opposed to a sealing substrate on which a common electrode is provided. A clearance space between the pixel substrate and the sealing substrate is filled with liquid crystal. Accordingly, when the pixel circuit controls the electric potential of each pixel electrode in accordance with a video signal, the electric potential differentiated for each pixel can be applied to the liquid crystal so as to change its optical characteristics to realize a desired display.

Furthermore, the liquid crystal of the liquid crystal cell 20 is a TN (Twist Nematic) type, according to which the alignment of the liquid crystal can be controlled by an alignment layer to which rubbing is applied. The twist of this liquid crystal is changeable in accordance with a control voltage applied thereto. According to the example, a polarizing plate 22 has a transparent axis extending in a 45° direction with respect to a rectangular screen.

More specifically, if the polarized light of the vertical direction (or lateral direction) of the screen is used for the display, the image will be seen differently when compared between the vertical and lateral directions. In other words, the displayed images have large viewing angle dependency and accordingly a uniform display will not be realized.

Accordingly, the polarizing plate 22 having a transparent axis extending in the 45° direction is disposed on the liquid crystal cell 20.

A first half-wave plate 24 and a second half-wave plate 26 are successively disposed on the polarizing plate 22. In each of the half-wave plates 24 and 26, the light on a slow axis is retarded 180° relative to the light on a fast axis. According to the example, the first half-wave plate 24 has a slow axis extending in a 79° direction. Therefore, when polarized light of the 45° direction is entered, the phase of a 79° component is retarded 180° compared with a 169° component. As a result, linearly polarized light of a 113° direction can be produced.

Furthermore, the second half-wave plate 26 having a slow axis extending in a 146° direction can convert the linearly polarized light of a 113° direction into polarized light of a 179° direction (substantially 180° direction).

Accordingly, the light projected on an inner surface of the windshield glass 16 can be polarized light of about 180° direction (horizontal direction). The projected light is then reflected from the windshield glass 16 as a horizontal beam. In the reflection, when the polarized light has a polarization axis extending in the horizontal direction, the reflectance is high. On the other hand, the polarized light having a polarization axis extending in the vertical direction almost passes through the windshield glass 16. Accordingly, projecting the polarized light of about 180° direction onto the windshield glass 16 assures higher reflectance and can realize an efficient display.

Furthermore, in the present example, the first and second half-wave plates 24 and 26 can cooperatively convert the polarized light having a polarization axis extending in the 45° direction emitted from the polarizing plate 22 into the polarized light having polarization axis of about 180° direction.

In the present example, the first and second half-wave plates 24 and 26 can be manufactured to give a phase difference of 270 nm between the slow axis and the fast axis with respect to a beam of 540 nm.

According to the first and second half-wave plates 24 and 26, the phase differences residing among RGB colors cannot be completely eliminated. However, the phase shifts caused twice by the first and second half-wave plates 24 and 26 can eliminate the differences in the phase shifts among the RGB colors and, as a result, can maintain a fine display.

For example, rotating of the polarization axis by an angle 180° can be realized by using a pair of half-wave plates each having a slow axis extending in the 45° direction with respect to a polarization axis of incident linearly polarized light. When this is done, the slow axes of two half-wave plates are differentiated from each other by 90°0. The light having passed through two half-wave plates can have uniform phases about RGB colors and will be linearly polarized light, again.

In the present example, the slow axis of the first half-wave plate 24 is shifted 34° relative to the polarization axis of the incident light. The slow axis of the second half-wave plate 26 is shifted 33° relative to the linearly polarized light having a polarization axis 113° that has passed the first half-wave plate 24. In other words, the slow axis of the second half-wave plate 26 extends in the 146° direction. The linearly polarized light can be obtained when RGB color beams pass through the first and second half-wave plates 24 and 26. Accordingly, obtained R and B color beams are elliptic polarized light. The light reflected from the windshield glass 16 has balanced RGB color beams.

SECOND STRUCTURAL EXAMPLE

Figure 3:
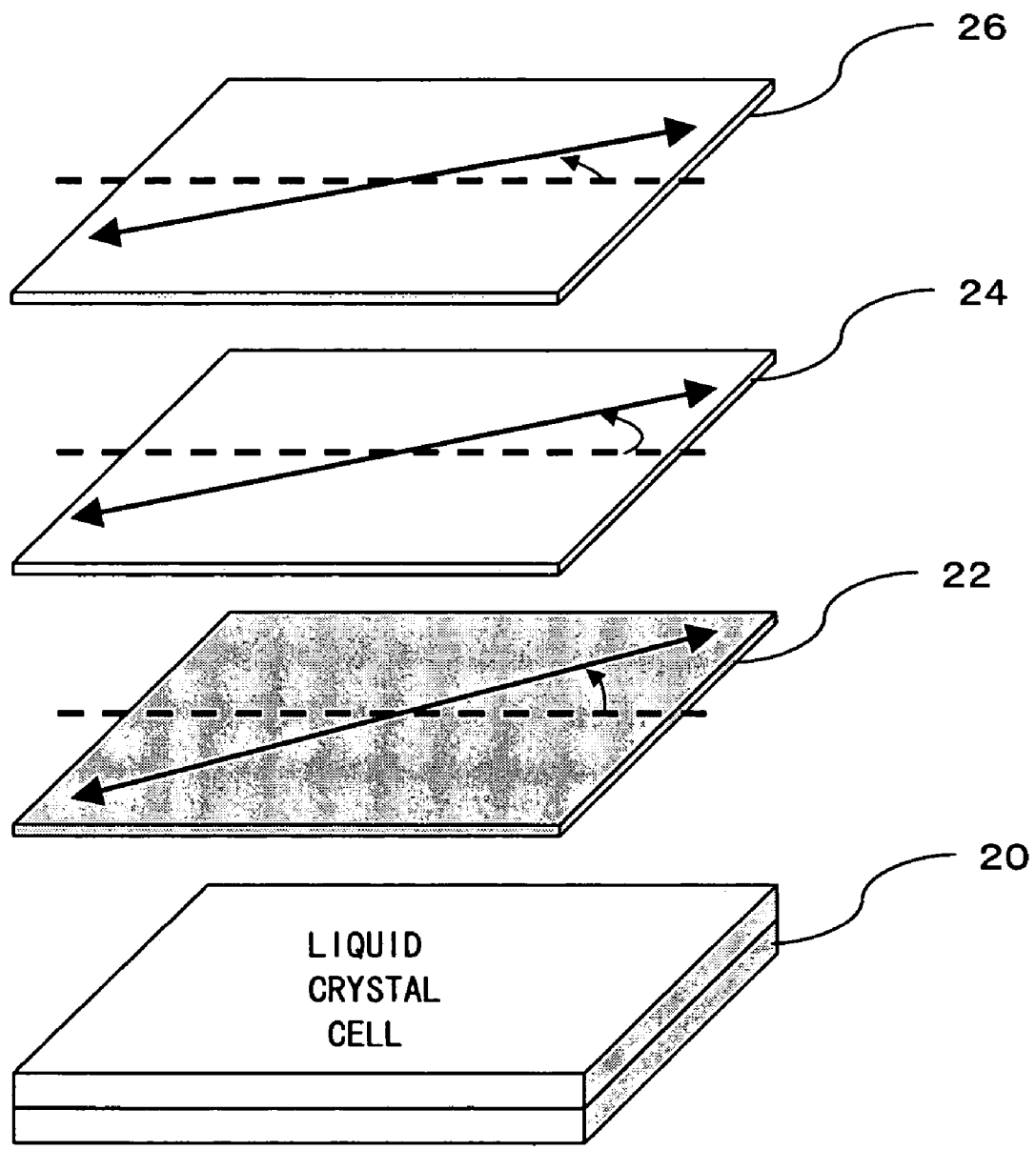
FIG. 3 is a perspective view showing the arrangement of a liquid crystal display apparatus according to a second structural example of the present invention.

FIG. 3 includes essential components of a liquid crystal display apparatus 12 according to a second structural example. In this example, the first half-wave plate 24 has a slow axis extending in a 33.5° direction, and the second half-wave plate 26 has a slow axis extending in a 11.5° direction.

With this arrangement, the linearly polarized light having a polarization axis extending in the 45° direction can be converted into linearly polarized light having a polarization axis extending in a 0° direction.

Similar to the above-described first structural example, highly efficient reflection of the light off the windshield glass 16 . In the second structural example, the transmissive light of the second half-wave plate 26 is more similar to elliptic polarized light with respect to the R and B color beams, compared to the light of the first structural example.

THIRD STRUCTURAL EXAMPLE

Figure 4:
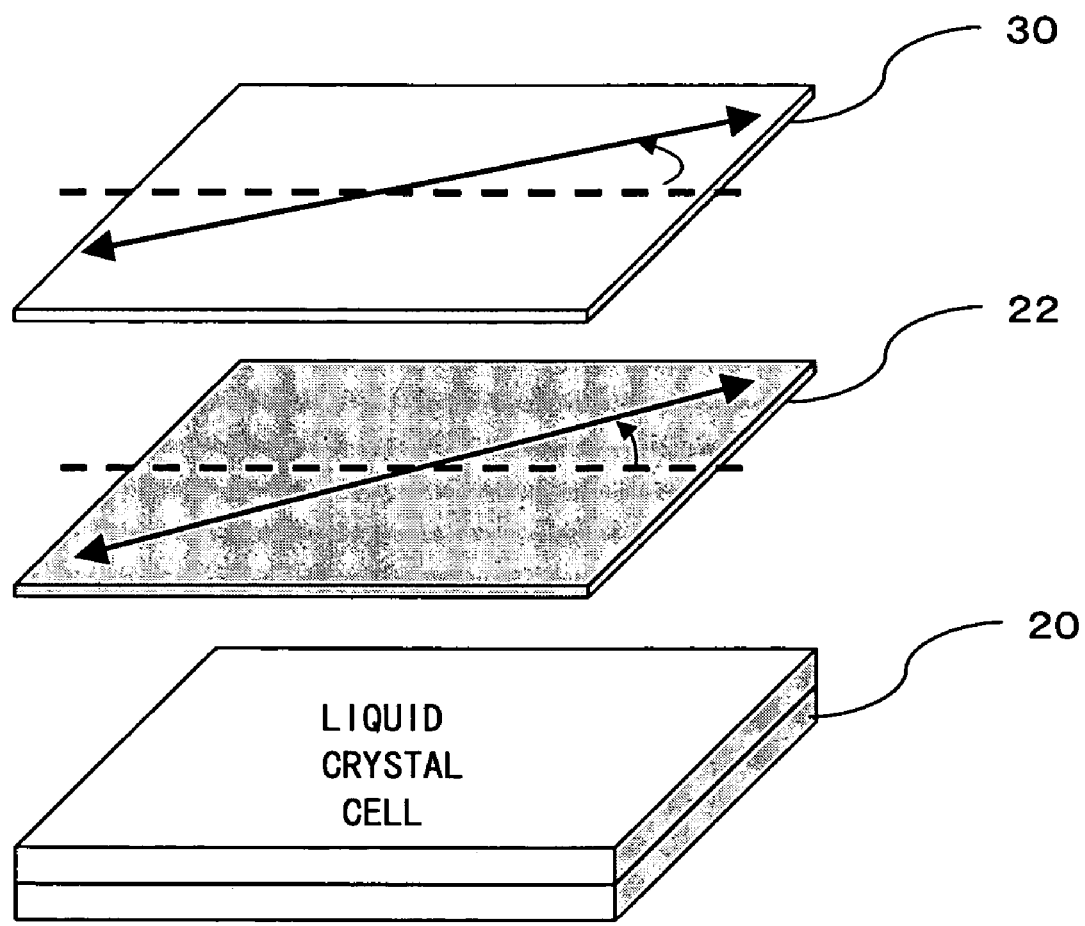
FIG. 4 is a perspective view showing the arrangement of a liquid crystal display apparatus according to a third structural example of the present invention.

FIG. 4 includes essential components of a liquid crystal display apparatus 12 according to a third structural example. In this example, only one half-wave plate 30 is provided. The half-wave plate 30 has a slow axis extending in a 22.5° direction.

With this arrangement, the linearly polarized light having a polarization axis extending in the 45° direction can be converted into linearly polarized light having a polarization axis extending in a 0° direction.

Similar to the above-described first and second structural examples, reflection of the light off the windshield glass 16 can be realized highly efficiently. In the third structural example, the transmissive light of the half-wave plate 30 is more similar to elliptic polarized light with respect to the R and B color beams than is the light of the first or second structural example.

FOURTH STRUCTURAL EXAMPLE

Figure 5:
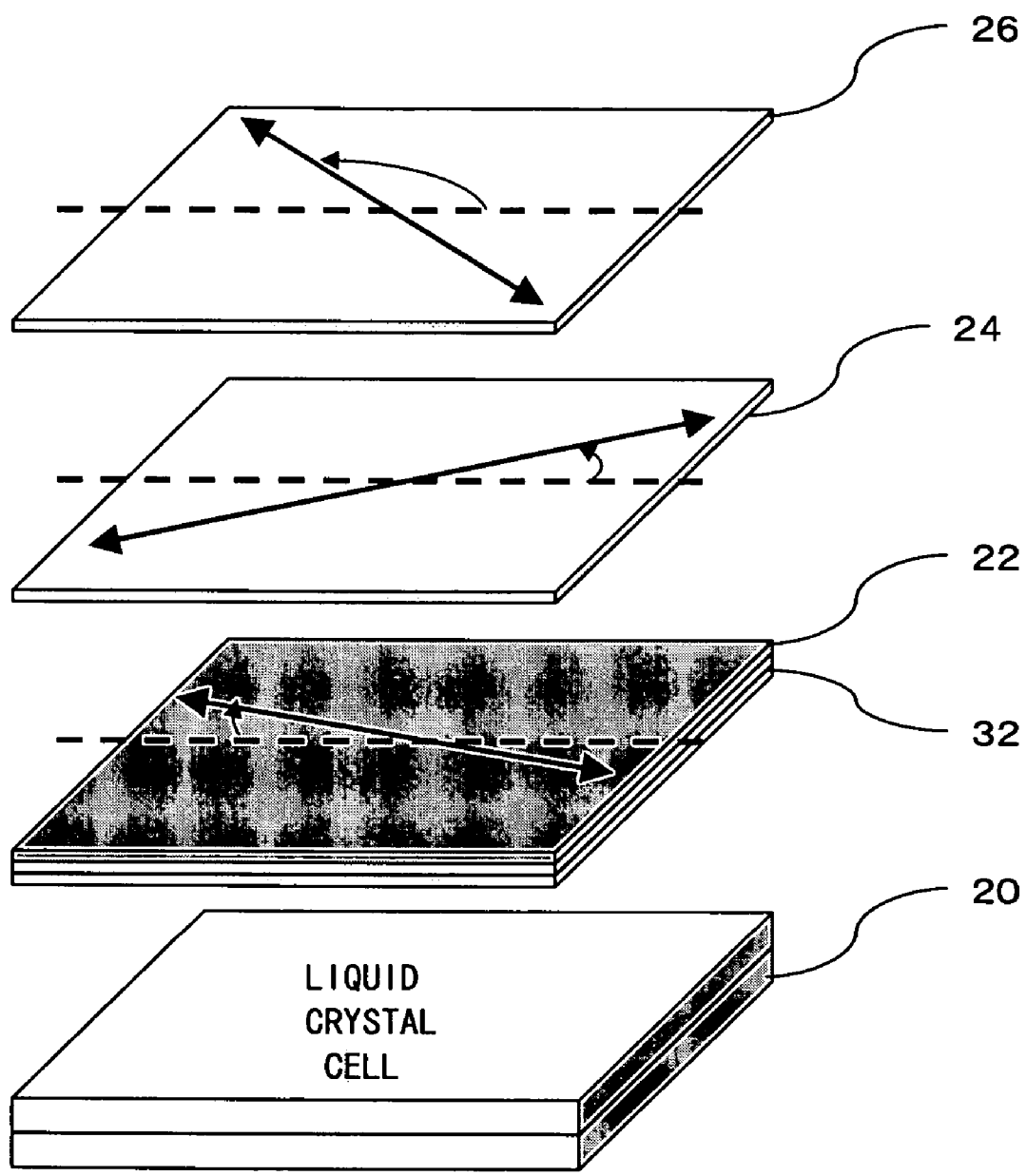
FIG. 5 is a perspective view showing the arrangement of a liquid crystal display apparatus according to a fourth structural example of the present invention.

FIG. 5 includes essential components of a liquid crystal display apparatus 12 according to a fourth structural example. In this example, the liquid crystal cell 20 is an ECB (Electrically Controlled Birefringence) type.

In ECB liquid crystal, a voltage applied to a liquid crystal layer is controllable to change the gradient of liquid crystal molecules. A pair of polarizing plates can detect a change in the birefringence characteristics resulting in the liquid crystal layer. The detected change in the birefringence characteristics can be utilized to realize a color display. When an alignment layer of the ECB type liquid crystal cell 20 has a rubbing axis extending in a 90° direction, the right and left view angles can be equalized to each other if the polarizing plate 22 disposed on an observation surface has a transparent axis extending in a 173° direction. Hence, the polarizing plate 22 is set to have a transparent axis extending in the 173° direction.

With such a configuration, the first half-wave plate 24 is set to have a slow axis extending in a 40° direction. The second half-wave plate 26 is set to have a slow axis extending in a 134° direction. With this arrangement, the polarized light having passed through the polarizing plate 22 and having a polarization axis extending in a 173° direction can be changed into 87° polarized light by the first half-wave plate 24 and then converted into 181° polarized light by the second half-wave plate 26.

Thus, even with this arrangement, polarized light having a polarization axis extending in a desired angle (180°: i.e., in the horizontal direction) can be obtained by twice shifting the polarization axis. Thus, the light having good linear polarization characteristics with respect to the RGB colors can be projected on the windshield glass 16.

A combined wave plate 32 consists of a half-wave plate and a quarter-wave plate, which can convert the circularly polarized light into linearly polarized light of a predetermined direction. Another wave plate, similar in arrangement, is provided at an incident side. Accordingly, the linearly polarized light can be converted into circularly polarized light, and the circularly polarized light can enter into the liquid crystal cell 20.

FIFTH STRUCTURAL EXAMPLE

Figure 6:
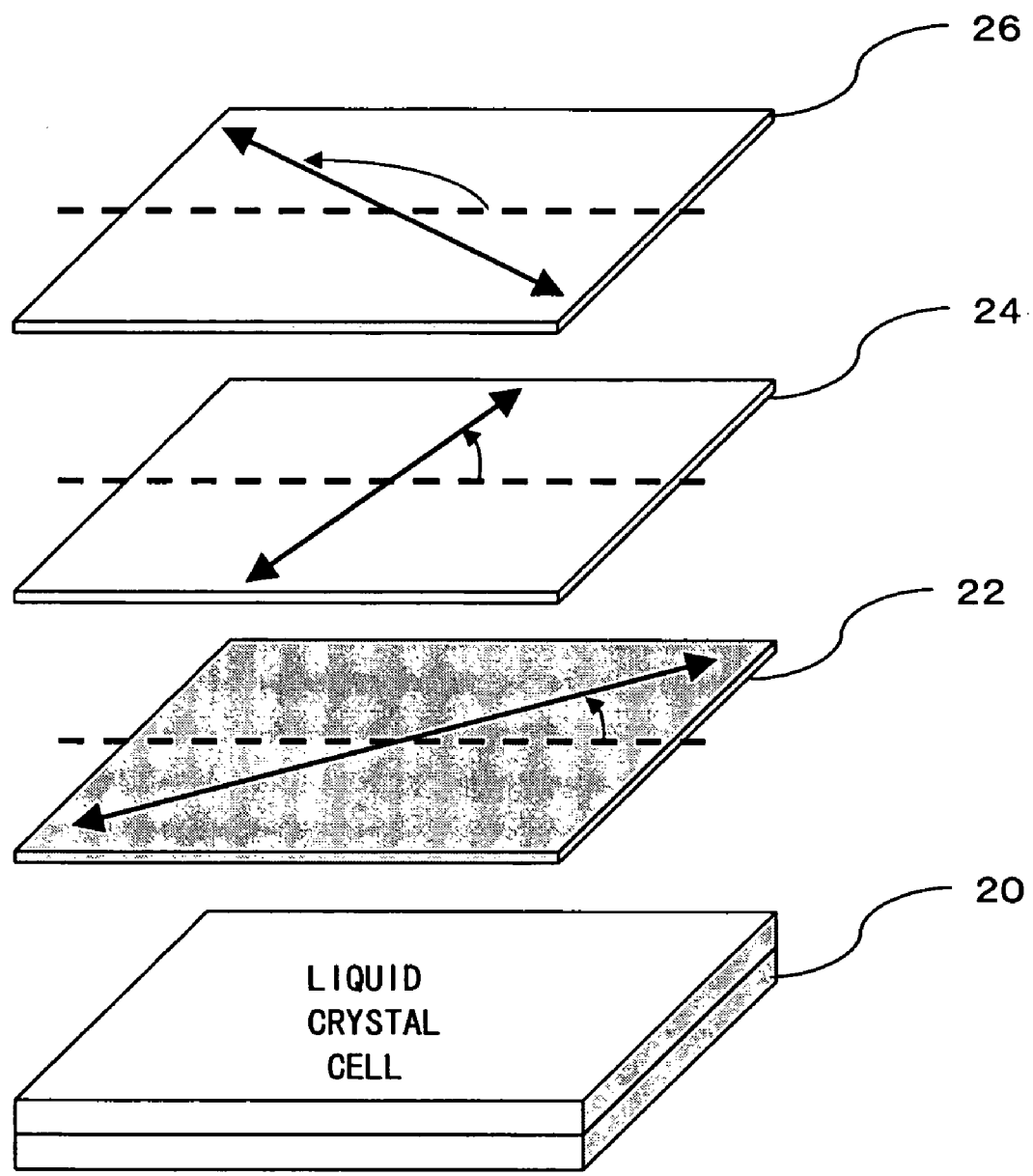
FIG. 6 is a perspective view showing the arrangement of a liquid crystal display apparatus according to a fifth structural example of the present invention.

FIG. 6 shows includes essential components of a liquid crystal display apparatus 12 according to a fifth structural example. In this example, the liquid crystal cell 20 is a VA (Vertical Alignment) type.

The VA type liquid crystal cell 20 includes edge and alignment ribs (i.e., protrusions) provided on the pixel electrode that can differentiate the alignment direction of the liquid crystal. In other words, the alignment direction is not limited to one direction and, in this example, the liquid crystal has two alignment directions extending in the 0° and 90° directions. Therefore, it is preferable that the polarizing plate 22 has a transparent axis extending in the 45° direction, so that the polarized light having a polarization axis not extending in the 0° or 90° direction can be used.

Hence, similar to the first structural example, it is preferable that the first and second half-wave plates 24 and 26 have slow axes extending in the 79° and 146° directions, respectively.

As described above, various types of liquid crystal can be employed to shift the polarization axis of the linearly polarized light having passed through the polarizing plate 22, with the half-wave plate 24 having a slow axis extending in a predetermined angle, so that the light projected on the windshield glass 16 has a polarization axis extending in the 180° direction (i.e., in the horizontal direction). The light can be reflected from the inner surface of the windshield glass 16 with a high efficiency, and a fine projection display can be realized.

SIXTH STRUCTURAL EXAMPLE

Figure 7:
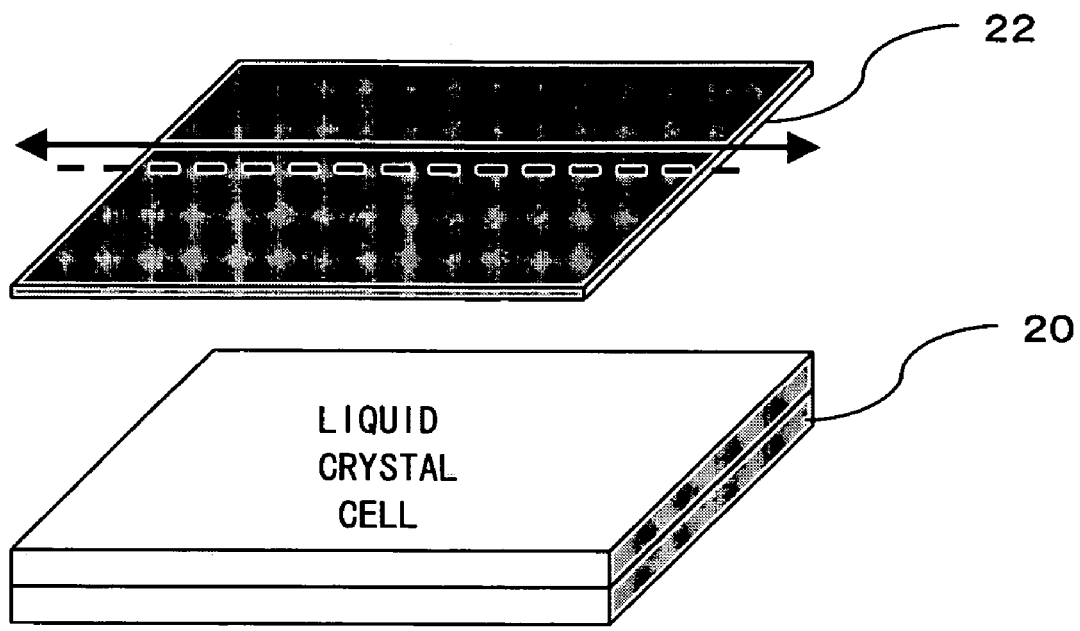
FIG. 7 is a perspective view showing the arrangement of a liquid crystal display apparatus according to a sixth structural example of the present invention.
Figure 8A:
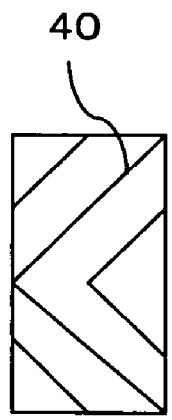
FIGS. 8A through 8D are views showing the arrangement of an alignment control member in the liquid crystal display apparatus according to the sixth structural example of the present invention.
Figure 8B:
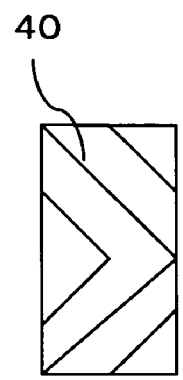
Figure 8C:
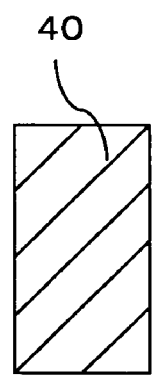
Figure 8D:
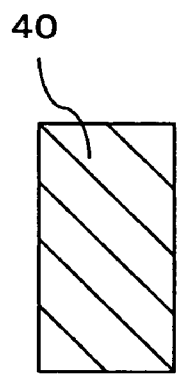

FIG. 7 shows an essential arrangement of the liquid crystal display apparatus 12 according to a sixth structural example. Similar to FIG. 6, the liquid crystal cell 20 shown in this example is a VA type.

The polarizing plate 22, disposed on the liquid crystal display cell 20, has an absorption axis extending in the 90° direction. Accordingly, the light irradiating the windshield glass 16 has a polarization axis extending in the 0° or 180° direction.

FIGS. 8A through 8D show practical patterns of ribs (or slits) functioning as an alignment control section 40, formed in each pixel of the liquid crystal cell 20, which extend in the 45° and 315° directions. According to the patterns of the examples, the liquid crystal inclines in 135° and/or 225° directions. When the polarized light passing through the liquid crystal layer has a polarization axis extending in the 0° (or 180°) direction, an appropriate liquid crystal display can be realized.

Similar effects will be obtained when the alignment control section 40 has a rib (or slit) pattern extending in the 135° and 225° directions and the liquid crystal inclines in the 45° and 315° directions.

Accordingly, the liquid crystal display apparatus 12 can emit light (i.e., modulated light) having a polarization axis extending in the 0° or 180° direction. The emitted light is reflected and projected on the windshield glass 16. The projection light has a polarization axis extending in the 0° or 180° direction (i.e., in the horizontal direction).

The light can be reflected off the inner surface of the windshield glass 16 with a high efficiency, and a fine projection display can be realized.

Furthermore, it is possible to irradiate the light, which is modulated by the liquid crystal based on a video signal, onto a transparent plate other than the windshield glass 16. In such a case, the light projected on the transparent plate should have a polarization axis extending in a direction perpendicular to the plane defined by incident light and reflective light of the transparent plate. Hence, it is preferable to control the direction of the polarization axis of the polarized light emitted from the liquid crystal display apparatus.

In general, in the projection display, the video should be projected on a plane normal to the horizontal direction. When a transparent plate other than the windshield glass 16 is employed for the projection display, the light irradiates the lower or upper surface of the transparent plate. In each case, it is preferable to use the polarized light having a polarization axis extending in the 180° direction (i.e., in the horizontal direction).

What is claimed is:

1. A heads-up display system comprising:
   a liquid crystal display unit configured to change optical characteristics in accordance with a video signal;
   a transparent plate having a surface on which light modulated by the liquid crystal display unit is projected, and configured to reflect the light so as to realize a projection display, wherein the light projected on the transparent plate is polarized light having a transmission axis extending in a direction parallel to a line defining the center with respect to incident light and reflective light of the transparent plate; and
   two half wave plates provided on a light emitting surface of the liquid crystal display unit, wherein the directions of slow axes of the half-wave plates can be independently determined, so as to adjust the direction of the transmission axis of the light irradiating the transparent plate and compensate deviations among transmission axes of a plurality of color beams.

2. The heads-up display system according to claim 1, wherein at least one of the half-wave plates has a slow axis extending in a predetermined direction and adjusts the transmission axis of the light irradiating the transparent plate.

3. The heads-up display system according to claim 1, wherein a liquid crystal used in the liquid crystal display unit is a VA liquid crystal, and an inclined direction of the liquid crystal, in each pixel of the liquid crystal display unit, is controllable to one of 45°, 135°, 225°, and 315° directions, depending on a voltage applied to the liquid crystal.

4. The heads-up display system according to claim 1, wherein the transparent plate is a windshield glass of an automotive vehicle.

5. The heads-up display system according to claim 1, wherein
   a polarization axis of the light emitted from the liquid crystal display unit is in a direction other than a horizontal direction and a vertical direction; and
   at least one half-wave plate which has a delay axis not in the horizontal direction nor the vertical direction is used to rotate the polarization axis of transmitting light, so that a polarization having a polarization axis in a direction perpendicular to the surface formed by the light incident on the transparent plate and the reflection light is obtained.

6. The heads-up display system according to claim 5, wherein two half-wave plates are used, directions of the delay axes of the two half wave plates are individually set, and a shift in the polarization axis in the individual light of R, G, and B of the light irradiated on the transparent plate is compensated.

7. A heads-up display system comprising:
   a liquid crystal display unit configured to change optical characteristics in accordance with a video signal; and
   a transparent plate having a surface on which light modulated by the liquid crystal display unit is projected, and configured to reflect the light so as to realize a projection display;
   light emitted from the liquid crystal display unit in a direction having a small viewing angle dependency of the liquid crystal display unit is projected on the transparent plate while a polarization of the light is set to have a polarization axis in a direction perpendicular to a surface formed by the light incident on the transparent plate and the reflection light.

8. The heads-up display system according to claim 7, wherein
   a polarization axis of the light emitted from the liquid crystal display unit is in a direction other than a horizontal direction and a vertical direction; and
   at least one half-wave plate which has a delay axis not in the horizontal direction nor the vertical direction is used to rotate the polarization axis of transmitting light, so that a polarization having a polarization axis in a direction perpendicular to the surface formed by the light incident on the transparent plate and the reflection light is obtained.

9. The heads-up display system according to claim 8, wherein two half-wave plates are used, directions of the delay axes of the two half-wave plates are individually set, and a shift in the polarization axis in the individual light of R, G, and B of the light irradiated on the transparent plate is compensated.

* * * * *